United States Patent
Ota et al.

(10) Patent No.: US 10,487,939 B2
(45) Date of Patent: Nov. 26, 2019

(54) CONTROL DEVICE OF AUTOMATIC TRANSMISSION FOR VEHICLE

(71) Applicants: TOYOTA JIDOSHA KABUSHIKI KAISHA, Toyota-shi, Aichi (JP); AISIN AW CO., LTD., Anjo-shi, Aichi (JP)

(72) Inventors: Keisuke Ota, Toyota (JP); Norihiro Tsukamoto, Toyota (JP); Masami Kondo, Niwa-gun (JP); Yuji Kajiyama, Anjo (JP); Daiki Fukuda, Anjo (JP)

(73) Assignees: TOYOTA JIDOSHA KABUSHIKI KAISHA, Toyota (JP); AISIN AW CO., LTD., Anjo (JP)

( * ) Notice: Subject to any disclaimer, the term of this patent is extended or adjusted under 35 U.S.C. 154(b) by 95 days.

(21) Appl. No.: 15/912,031

(22) Filed: Mar. 5, 2018

(65) Prior Publication Data
US 2018/0252313 A1    Sep. 6, 2018

(30) Foreign Application Priority Data

Mar. 3, 2017    (JP) .................................. 2017-041112

(51) Int. Cl.
*F16H 61/04* (2006.01)
*B60W 10/06* (2006.01)
(Continued)

(52) U.S. Cl.
CPC ............. *F16H 61/04* (2013.01); *B60W 10/06* (2013.01); *F16H 59/44* (2013.01);
(Continued)

(58) Field of Classification Search
None
See application file for complete search history.

(56) References Cited

U.S. PATENT DOCUMENTS 6,616,560 B2* 9/2003 Hayabuchi .......... F16H 61/0437
475/116
6,626,786 B2* 9/2003 Hayabuchi .......... F16H 61/0437
475/127
(Continued)

FOREIGN PATENT DOCUMENTS

| CN | 101514747 A | 8/2009 |
| CN | 104718402 A | 6/2015 |
| JP | 2014-137137 A | 7/2014 |

*Primary Examiner* — Dirk Wright
(74) *Attorney, Agent, or Firm* — Oliff PLC

(57) ABSTRACT

An automatic transmission control device is configured to execute a first shifting between a pre-shifting gear position and an intermediate gear position, and a second shifting between the intermediate gear position and a post-shifting gear position such that each of the first and second shiftings is executed by releasing one of engagement devices and engaging one of the engagement devices, and is configured, upon transition from the first shifting to the second transition, to gradually changing an engagement torque of an engagement-maintained engagement device as one of the engagement devices which is engaged upon completion of the first shifting and is maintained in the engaged state during the second shifting, such that the engagement torque of the engagement-maintained engagement device is changed gradually from a required engagement torque required upon completion of the first shifting, to a required engagement torque which is required in the second shifting.

6 Claims, 7 Drawing Sheets

(51) Int. Cl.
  *F16H 59/44* (2006.01)
  *F16H 61/02* (2006.01)
(52) U.S. Cl.
  CPC ..... *F16H 61/0204* (2013.01); *F16H 61/0437* (2013.01); *F16H 2061/0444* (2013.01); *F16H 2061/0451* (2013.01)

(56) References Cited

U.S. PATENT DOCUMENTS

| | | | |
|---|---|---|---|
| 8,323,150 B2* | 12/2012 | Atmaram | F16H 61/061 477/133 |
| 9,441,731 B2* | 9/2016 | Masunaga | B60W 10/06 |
| 10,221,943 B2* | 3/2019 | Ota | F16H 61/686 |
| 2009/0210121 A1 | 8/2009 | Tokura et al. | |
| 2015/0260280 A1 | 9/2015 | Masunaga et al. | |

* cited by examiner

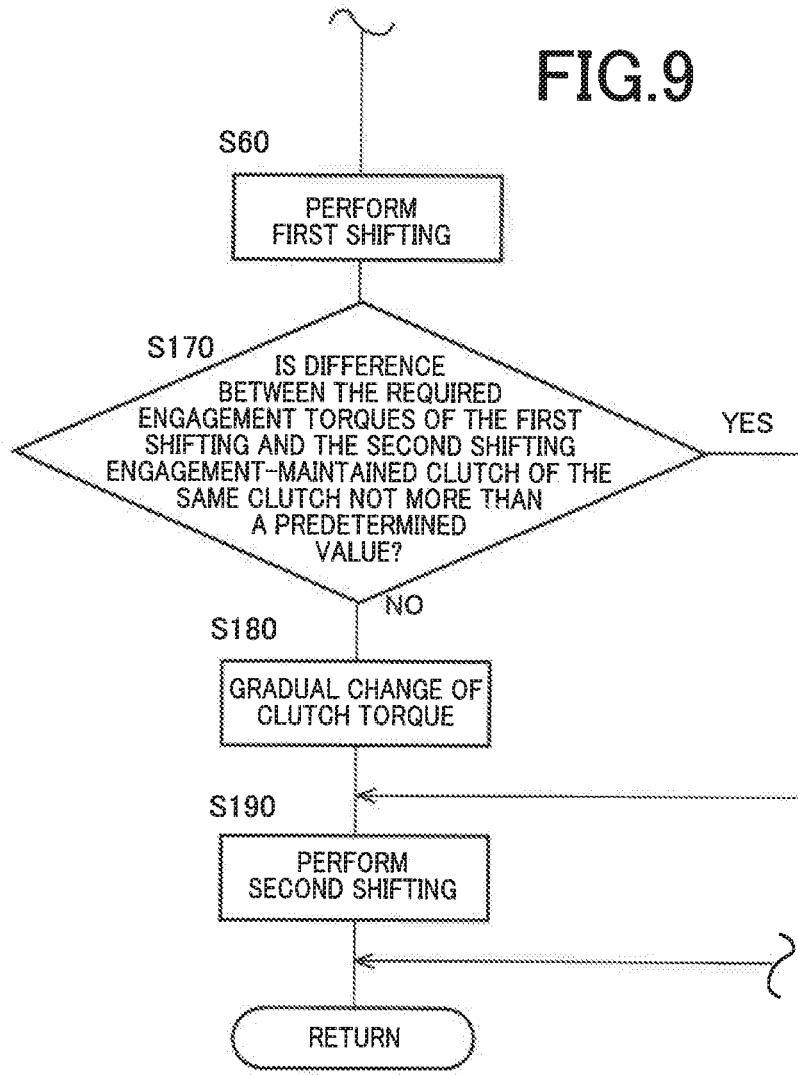

CONTROL DEVICE OF AUTOMATIC TRANSMISSION FOR VEHICLE

This application claims priority from Japanese Patent Application No. 2017-041112 filed on Mar. 3, 2017, the disclosure of which is herein incorporated by reference in its entirety.

FIELD OF THE INVENTION

The present invention relates to a control device for a vehicle that executes shifting control of an automatic transmission and particularly relates to an art of executing shifting of an automatic transmission using a shifting model.

BACKGROUND OF THE INVENTION

There is known a control device for vehicle that uses a predetermined shifting model, which determines control operation amounts for achieving shifting target values, to control shifting of an automatic transmission which includes a plurality of engagement devices that transmit rotation and torque between an input shaft receiving power from a driving force source and an output shaft transmitting the power to drive wheels, and executes shifting switching between engaging and releasing the engagement devices, and the control device executes the shifting using the shifting model with a constraint condition being introduced in a gear train motion equation if an engagement-maintained engagement device, an engaged state of which is maintained before and after the shifting, is included. Also, Patent Document 1 discloses an art where, when shifting between gear positions that is executed by releasing two engagement devices and engaging two engagement devices is performed, the shifting is executed by using the shifting model and executing a first shifting between a pre-shifting gear position and an intermediate gear position, and a second shifting between the intermediate gear position and a post-shifting gear position, via the intermediate gear position such that each of the first shifting and the second shifting is executed by releasing one engagement device and engaging one engagement device.

[PATENT DOCUMENT 1] JP-2014-137137A

SUMMARY OF THE INVENTION

When, as mentioned above, the shifting is executed as the first shifting and the second shifting via the intermediate gear position such that each of the first shifting and the second shifting is executed by releasing one engagement device and engaging one engagement device, the shifting model is switched to the shifting model, that is, the notion equation for the second shifting at a point when a torque phase of the first shifting is completed, that is, when a predetermined torque capacity is reached at the intermediate gear position. When the gear train motion equation is switched from that for the first shifting to that for the second shifting, a required engagement torque of the engagement device engaged in the first shifting changes from an amount upon completion of shifting to an amount for maintaining the engaged state in the second shifting. A case may therefore arise where the required engagement torque of the engagement device engaged in the first shifting increases rapidly and rapid change in rotational speed of the engagement device engaged in the first shifting occurs so that a slip rotation speed of the engagement device engaged in the first shifting becomes zero, and shifting shock occurs due to the change in rotational speed.

The present invention has been made with the above circumstances as the background and an object thereof is to provide a control device of automatic transmission for a vehicle which, in switching from the first shifting to the second shifting, suppresses the occurrence of the shifting shock due to the change in rotational speed in case where the rapid increase of the required engagement torque of the engagement device engaged in the first shifting occurs and rapid change in rotational speed of the engagement device engaged in the first shifting occurs such that the slip rotation speed of the engagement device engaged in the first shifting becomes zero.

To achieve the above object, a first aspect of the invention provides a control device of an automatic transmission for a vehicle that includes (i-1) a drive source and (ii-2) drive wheels, the automatic transmission including (ii-1) an input shaft receiving power from the drive source, (ii-2) an output shaft transmitting the power to the drive wheels, and (ii-3) a plurality of engagement devices that are selectively engaged and released to establish a plurality of gear positions in the automatic transmission, the control device being configured to execute shifting by successively controlling the engagement devices with required engagement torques calculated by introducing a constraint condition in gear train motion equations set in advance for determining control operation amounts that achieves shifting target values, the control device being configured, in a case where the shifting is executed by releasing two of the engagement devices and engaging two of the engagement devices, to execute a first shifting between a pre-shifting gear position and an intermediate gear position, and a second shifting between the intermediate gear position and a post-shifting gear position, such that each of the first shifting and the second shifting is executed by releasing one of the engagement devices and engaging one of the engagement devices, and the control device being configured, upon transition from the first shifting to the second transition, to gradually changing an engagement torque of an engagement-maintained engagement device as one of the engagement devices which is engaged to establish the intermediate gear position, and which is engaged upon completion of the first shifting and is maintained in the engaged state during the second shifting, such that the engagement torque of the engagement-maintained engagement device is changed gradually from a required engagement torque required upon completion of the first shifting, to a required engagement torque which is required in the second shifting and which is calculated by the gear train motion equations.

A second aspect of the invention provides the control device according to the first aspect of the invention, wherein the torque of the engagement-maintained engagement device is changed gradually from the required engagement torque required upon completion of the first shifting to the required engagement torque required in the second shifting in a gradual change period, such that a rate of change of the torque of the engagement-maintained engagement device at an initial stage of the gradual change period is gradually increased away from zero toward a given value that is larger than zero, such that a rate of change of the torque of the engagement-maintained engagement device at an intermediate stage of the gradual change period is the given value, and such that a rate of change of the torque of the engagement-maintained engagement device at a final stage of the gradual change period is gradually reduced away from the given value toward zero.

A third aspect of the invention provides the control device according to the first aspect of the invention, wherein the torque of the engagement-maintained engagement device is gradually changed from the required engagement torque required upon completion of the first shifting to the required engagement torque required in the second shifting in a gradual change period, such that a rate of change of the torque of the engagement-maintained engagement device at an initial stage of the gradual change period is a first constant value, such that a rate of change of the torque of the engagement-maintained engagement device at an intermediate stage of the gradual change period is a second value larger than the first constant value, and such that a rate of change of the torque of the engagement-maintained engagement device at a final stage of the gradual change period is a third constant value smaller than the second value.

A fourth aspect of the invention provides the control device according to any one of the first through third aspects of the invention, wherein the torque of the engagement-maintained engagement device is gradually changed from the required engagement torque required upon completion of the first shifting to the required engagement torque required in the second shifting in a gradual change period that is a given length of time.

A fifth aspect of the invention provides the control device according to the first aspect of the invention, wherein the torque of the engagement-maintained engagement device is gradually changed from the required engagement torque required upon completion of the first shifting to the required engagement torque required in the second shifting, when a difference between the required engagement torque required upon completion of the first shifting and the required engagement torque required in the second shifting is larger than a threshold value, and wherein the torque of the engagement-maintained engagement device is changed from the required engagement torque required upon completion of the first shifting to the required engagement torque required in the second shifting, in a non-gradual manner, when the difference between the required engagement torque required upon completion of the first shifting and the required engagement torque required in the second shifting is not larger than the threshold value.

A sixth aspect of the invention provides the control device according to any one of the first through third aspects of the invention, herein the torque of the engagement-maintained engagement device is gradually changed from the required engagement torque required upon completion of the first shifting to the required engagement torque required in the second shifting, when shifting from the pre-shifting gear position to the post-shifting gear position corresponds to power-on downshifting or power-off upshifting.

According to the first aspect of the invention, a control device of an automatic transmission is provided for a vehicle that includes (i-1) a drive source and (ii-2) drive wheels, the automatic transmission including (ii-1) an input shaft receiving power from the drive source, (ii-2) an output shaft transmitting the power to the drive wheels, and (ii-3) a plurality of engagement devices that are selectively engaged and released to establish a plurality of gear positions in the automatic transmission, the control device being configured to execute shifting by successively controlling the engagement devices with required engagement torques calculated by introducing a constraint condition in gear train motion equations set in advance for determining control operation amounts that achieves shifting target values, the control device being configured, in a case where the shifting is executed by releasing two of the engagement devices and engaging two of the engagement devices, to execute a first shifting between a pre-shifting gear position and an intermediate gear position, and a second shifting between the intermediate gear position and a post-shifting gear position, such that each of the first shifting and the second shifting is executed by releasing one of the engagement devices and engaging one of the engagement devices, and the control device being configured, upon transition from the first shifting to the second transition, to gradually changing an engagement torque of an engagement-maintained engagement device as one of the engagement devices which is engaged to establish the intermediate gear position, and which is engaged upon completion of the first shifting and is maintained in the engaged state during the second shifting, such that the engagement torque of the engagement-maintained engagement device is changed gradually from a required engagement torque required upon completion of the first shifting, to a required engagement torque which is required in the second shifting and which is calculated by the gear brain motion equations. Thereby, using a concise method that would not make the constraint conditions to become complex, smooth change of the rotation speed is enabled without causing stagnation of the input shaft rotation speed at the intermediate gear position and the occurrence of shock due to change of the inertial torque that arises from the torque difference of the required engagement torques at the intermediate gear position is suppressed.

According to the second aspect of the invention, the torque of the engagement-maintained engagement device is changed gradually from the required engagement torque required upon completion of the first shifting to the required engagement torque required in the second shifting in a gradual change period, such that a rate of change of the torque of the engagement-maintained engagement device at an initial stage of the gradual change period is gradually increased away from zero toward a given value that is larger than zero, such that a rate of change of the torque of the engagement-maintained engagement device at an intermediate stage of the gradual change period is the given value, and such that a rate of change of the torque of the engagement-maintained engagement device at a final stage of the gradual change period is gradually reduced away from the given value toward zero. As a result, the change of the inertial torque can be suppressed even more effectively.

According to the third aspect of the invention, the torque of the engagement-maintained engagement device is gradually changed from the required engagement torque required upon completion of the first shifting to the required engagement torque required in the second shifting in a gradual change period, such that a rate of change of the torque of the engagement-maintained engagement device at an initial stage of the gradual change period is a first constant value, such that a rate of change of the torque of the engagement-maintained engagement device at an intermediate stage of the gradual change period is a second value larger than the first constant value, and such that a rate of change of the torque of the engagement-maintained engagement device at a final stage of the gradual change period is a third constant value smaller than the second value. As a result, the change of the inertial torque can be suppressed even more effectively by an easy method.

According to the fourth aspect of the invention, the torque of the engagement-maintained engagement device is gradually changed from the required engagement torque required upon completion of the first shifting to the required engagement torque required in the second shifting in a gradual change period that is a given length of time. As a result, occurrence of shock due to change of inertial torque can be suppressed and thus making the control simple.

According to the fifth aspect of the invention, the torque of the engagement-maintained engagement device is gradually changed from the required engagement torque required upon completion of the first shifting to the required engagement torque required in the second shifting, when a difference between the required engagement torque required upon completion of the first shifting and the required engagement torque required in the second shifting is larger than a threshold value, wherein the torque of the engagement-maintained engagement device is changed from the required engagement torque required upon completion of the first shifting to the required engagement torque required in the second shifting, in a non-gradual manner, when the difference between the required engagement torque required upon completion of the first shifting and the required engagement torque required in the second shifting is not larger than the threshold value. This arrangement is effective to prevent the control from becoming complex.

According to the sixth aspect of the invention, the torque of the engagement-maintained engagement device is gradually changed from the required engagement torque required upon completion of the first shifting to the required engagement torque required in the second shifting, when shifting from the pre-shifting gear position to the post-shifting gear position corresponds to power-on downshifting or power-off upshifting. As a result, the occurrence of shock due to change of inertial torque can be suppressed more efficiently and the control can be simplified in shifting where a torque difference between the required engagement torque in the first shifting and the required engagement maintaining torque in the second shifting in the same engagement device is likely to arise during switching between the first shifting and the second shifting.

BRIEF DESCRIPTION OF DRAWINGS

FIG. 9 is an example of a flowchart in a case where, in the flowchart of FIG. 4, a second shifting is performed without executing the gradual change if a difference of required engagement torques of the clutch, for which the gradual change is scheduled between the first shifting and the second shifting, is not larger than a threshold value.

DETAILED DESCRIPTION OF PREFERRED EMBODIMENTS

Embodiments of the present invention shall now be described in detail with reference to the drawings. With the following embodiments, the figures are simplified or modified suitably and dimensional ratios, shapes, etc. of the respective portions are not necessarily drawn accurately.

Embodiment 1

Figures 1, 2:
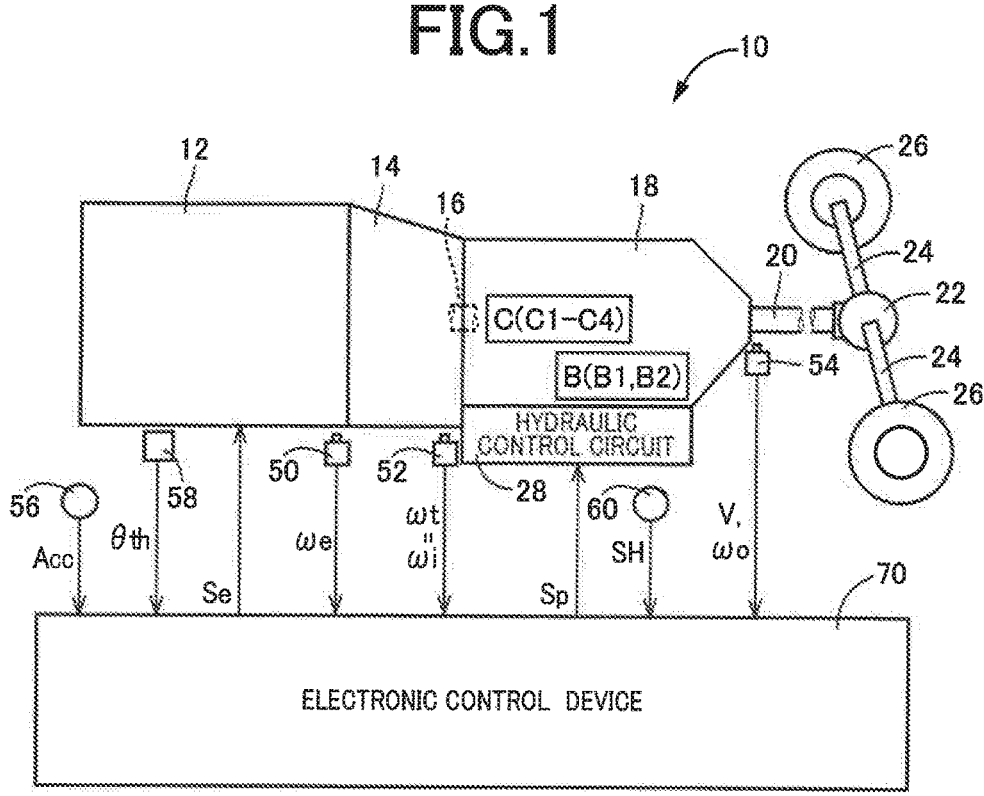
FIG. 1 is a diagram describing the general arrangement of respective portions related to running of a vehicle to which the present invention is applied and is also a diagram describing principal portions of a control system for controlling the respective portions.
FIG. 2 is an operation table (engagement table) describing relationships of shifting operations of an automatic transmission and combinations of operations of engagement devices used in the shifting operations.

FIG. 1 is a diagram describing the general arrangement of a power transmission path from an engine 12, as a driving force source included in a vehicle 10 to which the present invention is applied, to drive wheels 26 and is also a diagram describing principal portions of a control system provided in the vehicle 10. In FIG. 1, power generated by the engine 12 passes through a torque converter 14 and is input to an automatic transmission 18 through an input shaft 16 of the automatic transmission 18, and then transmitted from an output shaft 20 of the automatic transmission 18 to the right and left drive wheels 26 via a differential gear device (differential gear) 22, a pair of axles (drive shafts) 24, etc.

The automatic transmission 18 is a known planetary gear type automatic transmission, which includes a single set or a plurality of sets of planetary gear devices and a plurality of engagement devices inside a transmission case as a non-rotating member mounted to a vehicle body and a plurality of gear positions are alternatively established by the engagement devices. For example, the automatic transmission 18 is a stepped transmission that performs so-called clutch-to-clutch shifting where shifting is executed by switching engagement of predetermined ones of the plurality of engagement devices (that is, switching engagement and release of the engagement devices). Each of the plurality of engagement devices is a hydraulic type friction engagement device that transmits rotation i.e., torque between the input shaft 16 that receives the power from the engine 12 and the output shaft 20 that transmits the power to the drive wheels 26. The input shaft 16 is an input shaft of the automatic transmission 18 and is also a turbine shaft that is driven to rotate by a turbine impeller of the torque converter 14.

The hydraulic type friction engagement devices are clutches C and brakes B (hereinafter, the engagement devices shall be referred to as clutches C and/or brakes B), each of which is controlled to be engaged or released by a hydraulic control circuit 28 and changed in torque capacity, that is, engagement force by pressure regulation of a solenoid valve, etc. in the hydraulic control circuit 28 to selectively couple members at both sides between which the friction engagement device is interposed. Here, the torque capacity (hereinafter referred also to as clutch torque) of an engagement device is determined on the basis of a friction coefficient of a friction material of the engagement device and an engagement hydraulic pressure that presses a friction plate, for example. In order to transmit a torque (for example, a transmission input torque Ti, that is, a turbine torque Tt input to the input shaft 16) between the input shaft 16 and the output shaft 20 without causing slipping of the engaged engagement devices (that is, without letting a differential rotation speed in each of the engaged engagement devices), torque capacities, which provide the transmission torque amounts required to be generated by the respective engagement devices (that is, the allocated torques of the engagement devices) for that torque to be transmitted, are required. However, when the torque capacity is exceeded a value that is sufficient to provide the transmission torque amount, the transmission torque does not increase even if the torque capacity is increased further. With the present embodiment, clutch torque and engagement hydraulic pressure may be handled as being synonymous with each other for the sake of convenience.

In the automatic transmission 18, for example, eight forward drive gear positions are respectively established as a plurality of gear positions in accordance with accelerator operation by a driver, a vehicle speed V, etc. by respective engagement and/or release controls of clutches C (C1, C2, C3, and C4) and brakes B (B1 and B2) as shown in an engagement operation table of FIG. 2. For example, a low vehicle speed-side gear position (referred to as "a low gear position", for example, a first gear position 1st) is established by engagement of the clutch C1 and the brake B2, and a high vehicle speed-side gear position (referred to as "a high gear position", for example, a second gear position 2nd) is established by engagement of the clutch C1 and the brake B1. Therefore, when shifting between the low gear position (1st) and the high gear position (2nd), engagement switching is performed for the brake B2 and the brake B1. With the present embodiment, of the engagement devices, for which engagement switching is performed during shifting, the engagement device involved in the establishment of the low gear position (for example, the brake B2) shall be called the low gear position engagement device, and the engagement device involved in the establishment of the high gear position (for example, the brake B1) shall be called the high gear position engagement device. Also, if there is no particular need to distinguish between the clutches C and the brakes B as engagement devices, these may be referred to as clutches C and B without making any distinction in particular. The low gear position engagement device may become a released-side engagement device (hereinafter referred to as released-side clutch) when upshifting from the low gear position to the high gear position and may become an engaged-side engagement device (hereinafter referred to as engaged-side clutch) when downshifting from the high gear position to the low gear position. On the other hand, the high gear position engagement device may become an engaged-side clutch when upshifting, and may become a released-side clutch when downshifting.

Returning to FIG. 1, the vehicle 10 includes an electronic control device 70 that includes a shifting control device associated with, for example, shifting control of the automatic transmission 18, etc. The electronic control device 70 is arranged to include a so-called microcomputer that includes, for example, a CPU, a RAM, a ROM, an input/output interface, etc., and the CPU executes various controls of the vehicle 10 by performing signal processing in accordance with a program stored in the ROM in advance while utilizing a temporary storage function of the RAM. For example, the electronic control device 70 is arranged also to execute output control of the engine 12, shifting control of the automatic transmission 18, etc., and is arranged separately for each of engine control, hydraulic pressure control (shifting control), etc., as needed. Also various signals, for example, an engine rotation speed $\omega e$ expressing the rotation speed of the engine 12, a turbine rotation speed $\omega t$, that is, a transmission input rotation speed $\omega i$ expressing the rotation speed of the input shaft 16, a transmission output rotation speed $\omega o$ expressing the rotation speed of the output shaft 20 corresponding to the vehicle speed V, an accelerator opening Acc expressing an amount of driving force (driving torque) of the vehicle 10 required by the driver, a throttle valve opening $\theta th$, a shifting operation signal SH due to an operation of a shifting lever or a paddle switch, etc., which are detected by various sensors, for example, rotation speed sensors 50, 52, and 54, an accelerator opening sensor 56, a throttle opening sensor 58, a shifting sensor 60, etc., are respectively supplied to the electronic control device 70. Also, an engine output control command signal Se for output control of the engine 12, a hydraulic pressure command signal Sp for making the hydraulic control circuit 28 to control the hydraulic actuators of the automatic transmission 18, etc. are respectively output from the electronic control device 70.

For shifting control, there is a method of executing shifting of the automatic transmission 18 upon determining the torque capacities (or hydraulic pressure command values) during shifting in accordance with control maps, for example. The control maps are determined in advance by adaptation while evaluating whether or not shifting shock, shifting time, etc. are appropriate in an actual vehicle. With such a method that uses control maps, different control maps must be prepared respectively according to what type of shifting the shifting is. Therefore, as the number of gear positions of the automatic transmission 18 increases, more efforts become required for the adaptation process. The types of shifting are, for example, the various shifting modes expressed by combinations of various shifting patterns (shifting forms), such as power-on upshifting and power-on downshifting, each of which is shifting that accompanies the driving of the engine 12, and power-off upshifting and power-off downshifting, which do not accompany the driving of the engine 12, in other words, are performed when the engine 12 is not actuated, and various transitions between gear positions, such as between a first shifting position and second shifting position, between the second shifting position and a third shifting position, etc.

In the present embodiment, instead of the above-described method that uses control maps, a method of executing shifting of the automatic transmission 18 using a shifting model is employed for shifting control. The shifting model is determined in advance and is used to determine control operation amounts that achieve shifting target values. The shifting target values are target values of elements (shifting time, driving force, etc.) that determine a change mode that is desired to be realized during shifting. The control operation amounts are required values of elements (engine torque, clutch torque, etc.) that are operated for control system.

Shifting control of the automatic transmission 18 using a shifting model shall now be described. Motion equations of the automatic transmission 18 in the shifting are expressed by the following formula (1) and formula (2). The formula (1) and the formula (2) are derived from respective motion equations of mutually coupled rotating elements that constitute the automatic transmission 18 and relational expressions for planetary gear devices that constitute the automatic transmission 18. The motion equation of each rotating element is defined by using torques that respectively act on three members (sun gear, carrier, ring gear) of the planetary gear device and the member, among members at both sides of each engagement device, that is involved with the rotating element, where the torque is expressed by the product of inertia and a rate of change of the rotation speed of the rotating elements per unit time. Also, the relational expressions for the planetary gear device define a relationship of torques and a relationship of time rates of change of rotation speed of the three members of the planetary gear device, by using a gear ratio of the planetary gear device (=the number of teeth of the sun gear/the number of teeth of the ring gear) to respectively define. In the formula (1) and the formula (2), $d\omega t/dt$ is a time derivative, that is, a time rate of change of the turbine rotation speed $\omega t$ (that is, the transmission input rotation speed $\omega i$), and expresses an angular acceleration of the input shaft 16 (hereinafter, input shaft angular acceleration) as an amount of change of speed of a rotating member at the input shaft 16 side (in the drawings and the formulas, the time rate of change is indicated with a dot, and the same applies to the following description). $d\omega o/dt$ is a time rate of change of the transmission output rotation speed $\omega o$ and expresses an output shaft angular acceleration. The turbine torque Tt is a torque on the rotating member at the input shaft 16 side, that is, a torque on the input shaft 16 and corresponds to the transmission input torque Ti. In consideration of a torque ratio t of the torque converter 14, the turbine torque Tt is related to an engine torque Te (=Tt/t). A transmission output torque To is a torque on a rotating member at the output shaft 20 side, that is, a torque on the output shaft 20. Tcapl is an engaged-side required engagement torque and is a high gear position-side clutch torque when upshifting and is a low gear position-side clutch torque when downshifting. Tcdrn is a released-side required engagement torque and is a low gear position-side clutch torque when upshifting and is a high gear position-side clutch torque when downshifting. a1, a2, b1, b2, c1, c2, d1, d2 are respectively constants set in deriving the formula (1) and the formula (2) and are coefficients determined in terms of design from the inertias in the respective rotating elements and the gear ratios of the planetary gear device. Specific numerical values of the constants differ, for example, according to each type of shifting (for example, the shifting pattern or the gear positions between which the shifting is to be executed). Therefore, the motion equations are formulated uniquely, however, constants in the motion equations are defined differently for each type of shifting, and motion equations with suitable constants corresponding to the type of the shifting are applied for the respective types of shifting of the automatic transmission 18.

[Mathematical Formulas 1]

$$\dot{\omega}t = a1 \cdot Tt + b1 \cdot Tcapl + c1 \cdot Tcdrn + d1 \cdot \dot{\omega}o \tag{1}$$

$$To = a2 \cdot Tt + b2 \cdot Tcapl + c2 \cdot Tcdrn + d2 \cdot \dot{\omega}o \tag{2}$$

The formula (1) and the formula (2) are the gear train motion equations of the automatic transmission 18 that formulate the relationship of the shifting target values and the control operation amounts. The shifting target values express the respective target values of the shifting time and the driving force and are handled in the gear train motion equations. In the present embodiment, the input shaft angular acceleration $d\omega t/dt$ is used as an example of the element that expresses the shifting time. Also, the transmission output torque To is used as an example of the element that expresses the driving force. That is, in the present embodiment, the shifting target values are set by the two values of, the input shaft angular acceleration $d\omega t/dt$ and the transmission output torque To. Further, in the present embodiment, the control operation amounts for achieving these shifting target values are set by the three values of the turbine torque Tt (equivalent to the engine torque Te), the engaged-side required engagement torque Tcapl, and the released-side required engagement torque Tcdrn. Whereas the motion equations are thus constituted of the two formulas of the formula (1) and the formula (2), there are three control operation amounts and therefore it is not possible to uniquely obtain the control operation amounts that achieve the two shifting target values by solving the motion equations. Therefore, it is not possible to execute shifting of the automatic transmission 18 in a desired manner such as to realize the two shifting target values using the shifting model. The output shaft angular acceleration $d\omega o/dt$ is calculated from the transmission output rotation speed $\omega o$ that is a detection value of the rotation speed sensor 54.

Incidentally, it may be considered possible to uniquely solve the motion equations for the control operation amounts by adding a constraint condition to the motion equations of the formula (1) and the formula (2). It is considered difficult in the shifting control of the automatic transmission 18 to control an exchange of torque between the released-side clutch and the engaged-side clutch (that is, to control a shifting progress). In the present embodiment, torque allocations of transmission torque to be generated by the released-side clutch and that to be generated by the engaged-side clutch is set as the constraint condition. The torque allocations are suitable for expressing and controlling the exchange of torque during shifting and are applicable with any shifting pattern. That is, since the torque allocations of transmission torque is set as the constraint condition, the exchange of torque during shifting is incorporated in the motion equations and the control operation amounts are obtained uniquely. When a total transmission torque required to be generated by the released-side clutch and the engaged-side clutch during the shifting of the automatic transmission 18 (total transmission torque) is substituted, for example, with a torque on the input shaft 16 (input shaft total transmission torque), the torque allocations are the proportions of the transmission torques allocated respectively to both engagement devices with respect to the input shaft total transmission torque. In the present embodiment, the torque allocation of the engaged-side clutch is denoted by "xapl," the torque allocation of the released-side clutch is denoted by "xdrn," and the torque allocations are respectively defined by the following formula (3) and the following formula (4) using a torque allocation ratio x (for example, $0 \le x \le 1$) that changes in time sequence so as to reflect the exchange of torque during shifting.

$$xapl = x \tag{3}$$

$$xdrn = 1-x \tag{4}$$

A relational expression of the engaged-side required engagement torque Tcapl and the released-side required engagement torque Tcdrn may be defined based on "Tcapl" and "Tcdrn" being substituted with torques on the input shaft 16 and also the formula (3) and the formula (4), with use of "x" (=xapl) and "1−x" (=xdrn). From the formula (1), the formula (2) and the relational expression of "Tcapl" and "Tcdrn", relational expressions for calculating the turbine torque Tt, the engaged-side clutch torque Tcapl and the released-side clutch torque Tcdrn that are control operation amounts, are derived. The turbine torque Tt (related to the engine torque Te) is expressed by a relational expression using "x" (=xapl), "1−x" (=xdrn), the input shaft angular acceleration dωt/dt, the transmission output torque To, etc. Similarly, the engaged-side required engagement torque Tcapl is expressed by a relational expression using "x" (=xapl), the input shaft angular acceleration dωt/dt, the transmission output torque To, etc. Similarly, the released-side required engagement torque Tcdrn is expressed by a relational expression using "1−x" (=xdrn), the input shaft angular acceleration dωt/dt, the transmission output torque To, etc. That is, with the shifting model according to the present embodiment, the control operation amounts are calculated based on the shifting target values with use of the motion equations (the above-described formulas (1) and (2)) of the automatic transmission 18 which contain the shifting target values and the control operation amounts, and also the relationships (the formulas (3) and (4)) that respectively express the torque allocations. Thus, in the present embodiment, by adding the constraint condition set for the torque allocation ratio x to the formulas (1) and (2), the automatic transmission 18 is shifted with use of the shifting model.

However, there are cases where, as in shifting between a third gear position and an eighth gear position, shifting between a fourth gear position and a seventh gear position, etc., shifting (hereinafter referred to as multiple shifting) in which two engagement devices are released and two engagement devices are engaged, that is, shifting is executed without an engagement-maintained engagement device Cm (hereinafter referred to as engagement-maintained clutch Cm), the engagement of which is maintained before and after the shifting. In such case, the motion equations during shifting of the automatic transmission 18 are expressed by the following formula (5) and formula (6). The formula (5) and the formula (6) are derived similarly to the formula (1) and the formula (2). In the formula (5) and the formula (6), Tcapl1 and Tcapl2 are both engaged-side required engagement torques, and Tcdrn1 and Tcdrn2 are both released-side required engagement torques. Therefore, in multiple shifting, there are five control operation amounts in the form of the turbine torque Tt, the two engaged-side required engagement torques Tcapl1 and Tcapl2, and the two released-side required engagement torques Tcdrn1 and Tcdrn2. Therefore, the gear train motion equations cannot be solved uniquely by just adding a torque allocation ratio x1 of the engaged-side required engagement torque Tcapl1 and the released-side required engagement torque Tcdrn1 to the constraint condition.

[Mathematical Formulas 2]

$$\dot{\omega}a1 \cdot Tt + b1 \cdot Tcapl1 + c1 \cdot Tcapl2 + d1 \cdot Tcdrn1 + e1 \cdot Tcdrn2 + f1 \cdot \dot{\omega}o \quad (5)$$

$$To = a2 \cdot Tt + b2 \cdot Tcapl1 + c2 \cdot Tcapl2 + d2 \cdot Tcdrn1 + e2 \cdot Tcdrn2 + f2 \cdot \dot{\omega}o \quad (6)$$

Thus in multiple shifting, the electronic control unit 70 executes a first shifting S1 between a pre-shifting gear position and an intermediate gear position M1, and a second shifting S2 between the intermediate gear position M1 and a post-shifting gear position, via the intermediate gear position M1, such that each of the first shifting and the second shifting is shifting that is performed by releasing one engagement device and engaging one engagement device. That is, in the multiple shifting, the multiple shifting is deemed to be a multiple stage shifting where the intermediate gear position M1 is set with which the shifting away from the pre-shifting gear position is made by a single element release and a single element engagement and the shifting toward the post-shifting gear position is made by a single element release and a single element engagement, and the first shifting S1 between the pre-shifting gear position and the intermediate gear position M1, and the second shifting S2 between the intermediate gear position M1 and the post-shifting gear position, are executed successively. In other words, by performing engagement shifting by combining two shiftings, in each of the two shiftings, there is an engagement clutch in common to the pre-shifting gear position and the post-shifting gear position, that is, an engagement-maintained clutch Cm, it is possible to decrease the control operation amounts and solve the gear train motion equations uniquely by just adding the constraint condition in the form of the torque allocation ratio x1 of the engaged-side required engagement torque Tcapl1 and the released-side required engagement torque Tcdrn1.

Specifically, the motion equations (the formulas (5) and (6)) during the multiple shifting are deemed to be motion equations (the next formulas (7) and (8)) during the first shifting S1 and motion equations (the following formulas (9) and (10)) during the second shifting S2. The formulas (7) and (9) and the formulas (8) and (10) are derived similarly to the formula (1) and the formula (2). In the formulas (7) and (8), Tcapl1 is the torque capacity (first-shifting engaged-side required engagement torque) of the engaged-side clutch (first-shifting engaged-side clutch) in the first shifting S1, and Tcdrn1 (first-shifting released-side required engagement torque) is the torque capacity of the released-side clutch (first-shifting released-side clutch) in the first shifting S1. In the formulas (9) and (10), Tcapl2 is the torque capacity (second-shifting engaged-side required engagement torque) of the engaged-side clutch (second-shifting engaged-side clutch) in the second shifting S2, and Tcdrn2 (second-shifting released-side required engagement torque) is the torque capacity of the released-side clutch (second-shifting released-side clutch) in the second shifting S2. Then, as in the formulas (3) and (4), the torque allocations (x1, xapl1, and xdrn1) of the first-shifting engaged-side clutch and the first-shifting released-side clutch are set in the motion equations (the following formulas (7) and (8)) during the first shifting S1, and the torque allocations (x2, xapl2, and xdrn2) of the second-shifting engaged-side clutch and the second-shifting released-side clutch are set in the motion equations (the following formulas (9) and (10)) during the second shifting S2, thereby making it possible to uniquely solve the gear train motion equations in each shifting for the control operation amounts, with the result that it is possible to appropriately carry out the shift and consequently enabling the multiple shifting to be executed appropriately using the shifting model.

[Mathematical Formulas 3]

$$\dot{\omega}t = a1 \cdot Tt + b1 \cdot Tcapl1 + c1 \cdot Tcdrn1 + d1 \cdot \dot{\omega}o \quad (7)$$

$$To = a2 \cdot Tt + b2 \cdot Tcapl1 + c2 \cdot Tcdrn1 + d2 \cdot \dot{\omega}o \quad (8)$$

$$\dot{\omega}t = a1 \cdot Tt + b1 \cdot Tcapl2 + c1 \cdot Tcdrn2 + d1 \cdot \dot{\omega}o \quad (9)$$

$$To = a2 \cdot Tt + b2 \cdot Tcapl2 + c2 \cdot Tcdrn2 + d2 \cdot \dot{\omega}o \quad (10)$$

Here, in the shifting control of the automatic transmission 18, there are shift patterns, such as power-on upshifting, power-off upshifting, power-on downshifting and power-off downshifting, as mentioned above. For example, in power-on upshifting or power-off downshifting, a direction in which the turbine rotation speed ωt (that is, the transmission input rotation speed ωi) is changed by the engine torque Te (which is a positive torque in the power-on case or is a negative torque (engine friction torque) in the power-off case) differs from a direction of change of the turbine rotation speed ωt in accompaniment with the shifting (direction of movement due to the shifting). That is, in power-on upshifting or power-off downshifting, the shifting cannot be made to progress spontaneously by the engine torque Te. The shifting thus cannot be made to progress by decreasing just the absolute magnitude of the released-side required engagement torque Tcdrn, without changing the torque allocations (that is, by just making the released-side clutch transition toward release), and it is therefore required to change, by means of the engaged-side clutch, the turbine rotation speed ωt in the direction of change in accompaniment with the shifting, and a timing at which the torque allocations are changed is set to be before the start of an inertia phase.

Also, in power-off upshifting or power-on downshifting, the engine torque Te changes the turbine rotation speed ωt in the direction of change in accompaniment with the shifting. That is, in power-off upshifting or power-on downshifting, the shifting can be made to progress spontaneously by the engine torque Te. The shifting thus can be made to progress by decreasing just the absolute magnitude of the released-side required engagement torque Tcdrn without changing the torque allocations and therefore there is no need to change, by means of the engage-side clutch change, the turbine rotation speed ωt in the direction of change in accompaniment with the shifting. If, in power-off upshifting or power-on downshifting, an attempt is made to make the shifting progress by means of the engaged-side clutch, the inertial torque may increase shifting shock. Thus, to make the shifting progress appropriately, the timing at which the torque allocations are changed is set at an inertia phase completion time, that is, a torque phase starting time.

Also, to prevent stagnation of the input shaft rotation speed ωi at a synchronous rotation speed after completion of the first shifting, the engaged-side clutch in the first shifting S1 is set such that engagement is not completed and a slip rotation ωs occurs at the engaged-side clutch even at the torque phase completion time of the first shifting S1, that is, the point of time at which the torque capacity of the engaged-side clutch in the first shifting S1 reaches the target value of the output torque Mo of the intermediate gear position M1. When, at the torque phase completion time of the first shifting S1, switching from the motion equations and the constraint condition during the first shifting S1 to the motion equations and the constraint condition during the second shifting S2 is performed, the engaged-side required engagement torque Tcapl1 in the first shifting S1 is changed to an engagement-maintained clutch required engagement torque Tct2 for maintaining the engaged state in the second shifting S2. Thus, if the slip rotation ωs is occurring at the engaged-side clutch in the first shifting S1 even at the torque phase completion time of the first shifting S1, that is, at the point of time at which the torque capacity of the engaged-side clutch in the first shifting S1 reaches the target output torque To of the intermediate gear position M1, the targeted clutch torque is increased such that the torque of the engaged-side clutch in the first shifting S1 changes from the clutch torque Tcapl1 (at which the slip rotation ωs is occurring), to the engagement-maintained clutch required engagement torque Tct2 for complete engagement as the engagement-maintained clutch Cm in the second shifting S2. (The clutch torque that is a control operation amount in the motion equations is also referred to as the required engagement torque.) In power-off upshifting and power-on downshifting, the slip rotation speed ωs at the engaged-side clutch in the first shifting S1 changes rapidly toward zero, a rapid change of the output torque To due to inertial torque occurs, and shifting shock occurs. An art capable of alleviating the shifting shock in power-off upshifting or power-on downshifting shall now be described mainly by way of power-on downshifting. The shifting shock hardly occurs in power-on upshifting or power-off downshifting.

Returning back to FIG. 3, a functional block diagram of principal control functions of the electronic control device 70 shall be described. The electronic control device 70 is constituted of an engine output controlling portion 72, a shifting controlling portion 74, a required engagement torque calculating portion 76, and a multiple shifting controlling portion 82. Also, the required engagement torque calculating portion 76 includes a torque allocation calculating means, that is, a torque allocation calculating portion 78, and a shifting required value calculating means, that is, a shifting required value calculating portion 80. The multiple shifting controlling portion 82 includes an intermediate gear position setting means, that is, an intermediate gear position setting portion 84, and a clutch torque gradual change calculating means, that is, a clutch torque gradual change calculating portion 86.

An engine output controlling means, that is, the engine output controlling portion 72 performs opening/closing control of an electronic throttle valve by means of a throttle actuator for throttle control and also controls a fuel injection amount by means of a fuel injection device for fuel injection amount control and outputs an engine control command signal Se that controls an ignition device, such as an igniter etc., for ignition timing control such that, for example, a required engine torque Te (hereinafter, required engine torque Tedem) is obtained.

A shifting controlling means, that is, the shift controlling portion 74 executes shifting control of the automatic transmission 18. Specifically, the shift controlling portion 74 performs shifting determination, based on a vehicle state represented by the actual vehicle speed V and an actual accelerator opening Acc, from a known relationship (shift map or variogram), which is stored in advance and has the vehicle speed V and the accelerator opening Acc as variables. And, when the shift controlling portion 74 determines that shifting of the automatic transmission 18 should be executed, it executes automatic shifting control of the automatic transmission 18 such that a gear position to which shifting is to be executed is obtained. For example, the shift controlling portion 74 outputs the hydraulic pressure command signal Sp, which makes the engagement devices associated with the shifting of the automatic transmission 18 become engaged and/or released, to the hydraulic control circuit 28 such that the determined gear position is achieved. Examples of the hydraulic pressure command signal Sp include a hydraulic pressure command value for obtaining the torque capacity of the released-side clutch (hereinafter referred to as released-side required engagement torque) and a hydraulic pressure command value for obtaining the torque capacity of the engaged-side clutch (hereinafter referred to as engaged-side required engagement torque).

If it is determined by the shifting controlling portion 74 that shifting of the automatic transmission 18 is in progress, a required engagement torque calculating means, that is, the required engagement torque calculating portion 76 calculates the operation control amounts based on the above-described shifting target values, with used of the above-described shifting model. Specifically, the required engagement torque calculating portion 76 includes the torque allocation calculating portion 78 and the shifting required value calculating portion 80.

The torque allocation calculating portion 78 calculates the torque allocation ratio x, for example, based on an elapsed time from a change starting time (or shifting control starting time, previous calculation time, etc.), from a relationship (shifting progress map) in which a mode (for example, a rate of change, etc.) of changing the torque allocation ratio x is determined in advance. Then, based on the calculated torque allocation ratio x, the torque allocation calculating portion 78 calculates the torque allocation ratio xapl of the engaged-side clutch and the torque allocation ratio xdrn of the released-side clutch from the formula (3) and the formula (4). The shifting progress map is, for example, determined in advance for each type of shifting (shifting pattern or gear positions between which the shifting is to be executed). Also, an initial value of the torque allocation ratio x is set to "0."

The shifting required value calculating portion 80 calculates a target value of the input shaft angular acceleration $d\omega t/dt$ during the inertia phase, for example, based on an elapsed time from an inertia phase starting time (or previous calculation time), from a relationship (input shaft angular acceleration change map) in which a mode of changing the input shaft angular acceleration $d\omega t/dt$ is predetermined such that a change in the turbine rotation speed $\omega t$ (=transmission input rotation speed $\omega i$) during the inertia phase will be a predetermined change that achieves both suppression of shift shock and reduction of the shifting time. Also, for example, at stages other than the inertia phase, the shifting required value calculating portion 80 calculates a target value of the input shaft angular acceleration $d\omega t/dt$ based of a change in the turbine rotation speed $\omega t$ (=transmission input rotation speed $\omega i$). In addition, the shifting required value calculating portion 80 calculates a target value of the transmission output torque To, for example, based on a required driving force. Fdem calculated by the engine output controlling portion 72 and an elapsed time from the shifting control starting time (or previous calculation time), from a relationship (transmission output torque change map) in which a mode of changing the transmission output torque To is predetermined. The input shaft angular acceleration change map and the transmission output torque change map are, for example, predetermined for each type of shifting (shifting pattern or gear positions between which the shifting is to be executed).

The required engagement torque calculating portion 76 calculates, as the control operation amounts, the respective required values of the turbine torque Tt (related to the engine torque Te), the engaged-side required engagement torque Tcapl and released-side required engagement torque Tcdrn, based on the torque allocations (x, xapl, and xdrn) of the engagement devices calculated by the torque allocation calculating portion 78 and the shifting target values (respective target values of $d\omega t/dt$ and To) calculated by the shifting required value calculating portion 80, from the relational expressions for calculating the control operation amounts.

If the shifting controlling portion 74 determines that the shifting that is being executed is a power-on downshifting or a power-off upshifting and is a multiple shifting, in which the above-described shifting model cannot be used in a single step shifting, that is, switching of the engagement-maintained clutch Cm is required, the intermediate gear position setting portion 84 of the multiple shifting controlling portion 82 performs setting of the intermediate gear position M1 based on a map stored in advance. The required engagement torque calculating portion 76 calculates the respective required values of the turbine torque Tt (related to the engine torque Te), the engaged-side required engagement torque Tcapl and released-side required engagement torque Tcdrn, as the control operation amounts in the first shifting S1. The engine output controlling portion 72 and the shifting controlling portion 74 control the engine torque Te, the engaged-side required engagement torque Tcapl and released-side required engagement torque Tcdrn, based on the operation control amounts calculated by the required engagement torque calculating portion. In regard to the setting of the intermediate gear position, although it was deemed that the setting of the intermediate gear position and the gradual change of the clutch torque are performed if the shifting that is being executed is a power-on downshifting or a power-off upshifting and is a multiple shifting, the control described below, that is, the gradual change based on a determination of a need to perform the gradual change may be performed also in power-off downshifting or power-on upshifting, in which a torque difference is unlikely to occur during switching between the first shifting and the second shifting in comparison to power-on downshifting or power-off upshifting.

The shifting controlling portion 74 determines the completion of the first shifting S1, when, for example, the transmission output torque To reaches the target output torque To in the inertia phase of the second shifting S2 and the turbine rotation speed $\omega t$ (=transmission input rotation speed $\omega i$) reaches a predetermined rotation speed stored in advance according to each gear position. When the shifting controlling portion 74 determines the completion of the first shifting S1, the clutch torque gradual change calculating portion 86 sets, based, for example, on a relationship (map) stored in advance according to each shifting position (type of shifting), a gradual change rate Tg, which is a rate of the gradual change per unit time from a required value Tcfl (required at the first shifting completion time) of the engaged-side required engagement torque Tcapl1 in the first shifting S1, to a required value of the engagement-maintained clutch Cm, determined by the motion equations of the second shifting S2, that is, the second shifting engagement-maintained clutch required engagement torque Tct2 required for making the engaged-side clutch in the first shifting S1 become completely engaged, and performs control via the shifting controlling portion 74. Preferably, the gradual change rate Tg is set such that the change, from the required value Tcfl (required at the first shifting completion time) of the engaged-side required engagement torque Tcapl1 in the first shifting S1 to the second shifting engagement-maintained clutch required engagement torque Tct2, which is the target torque required for achieving complete engagement, is completed in a predetermined time ta. After the gradual change is started, the torque allocation calculating portion 78 and the shifting required value calculating portion 80 of the required engagement torque calculating portion 76 calculate the control operation amounts successively by solving the motion equations in the second shifting S2 in the same manner as in the first shifting S1, and the gradual change rate Tg, which is the rate of the gradual change to the second shifting engagement-maintained clutch required engagement torque Tct2, also changes successively based on the calculation. By the gradual change, the engaged-side required engagement torque Tcapl reaches the second shifting engagement-maintained clutch required engagement torque Tct2 when a predetermined time elapses after initiation of the gradual change. Further, when a predetermined time elapses after the engaged-side required engagement torque Tcapl reaches the second shifting engagement-maintained clutch required engagement torque Tct2, the torque is increased to a torque value with which a predetermined safety factor for maintaining the engagement is taken into consideration, and the second shifting S2 is executed.

An engagement pressure of the second shifting released-side clutch, which is the engagement-maintained clutch Cm in the first shifting S1, remains maintained, for example, at a maximum engagement pressure so that the engagement is maintained during the first shifting S1. Therefore, there is a possibility for the second shifting released-side required engagement torque to remain excessively in the switching from the first shifting S1 to the second shifting S2, so that the second shifting released-side clutch cannot give rise to differential rotation swiftly and a shifting shock may occur due to a delay in the change in the changing process of the transmission input rotation speed ωi that accompanies the shifting. Thus, in the present embodiment, during transition from the first shifting S1 to the second shifting S2, the electronic control device 70 decreases the second shifting released-side required engagement torque in comparison to that before the start of the first shifting S1. That is, in order to make the second shifting released-side clutch capable of generating the differential rotation swiftly in the switching to the second shifting S2, the second shifting released-side required engagement torque is decreased in advance from during the first shifting S1 in preparation of the second shifting S2.

Figure 4:
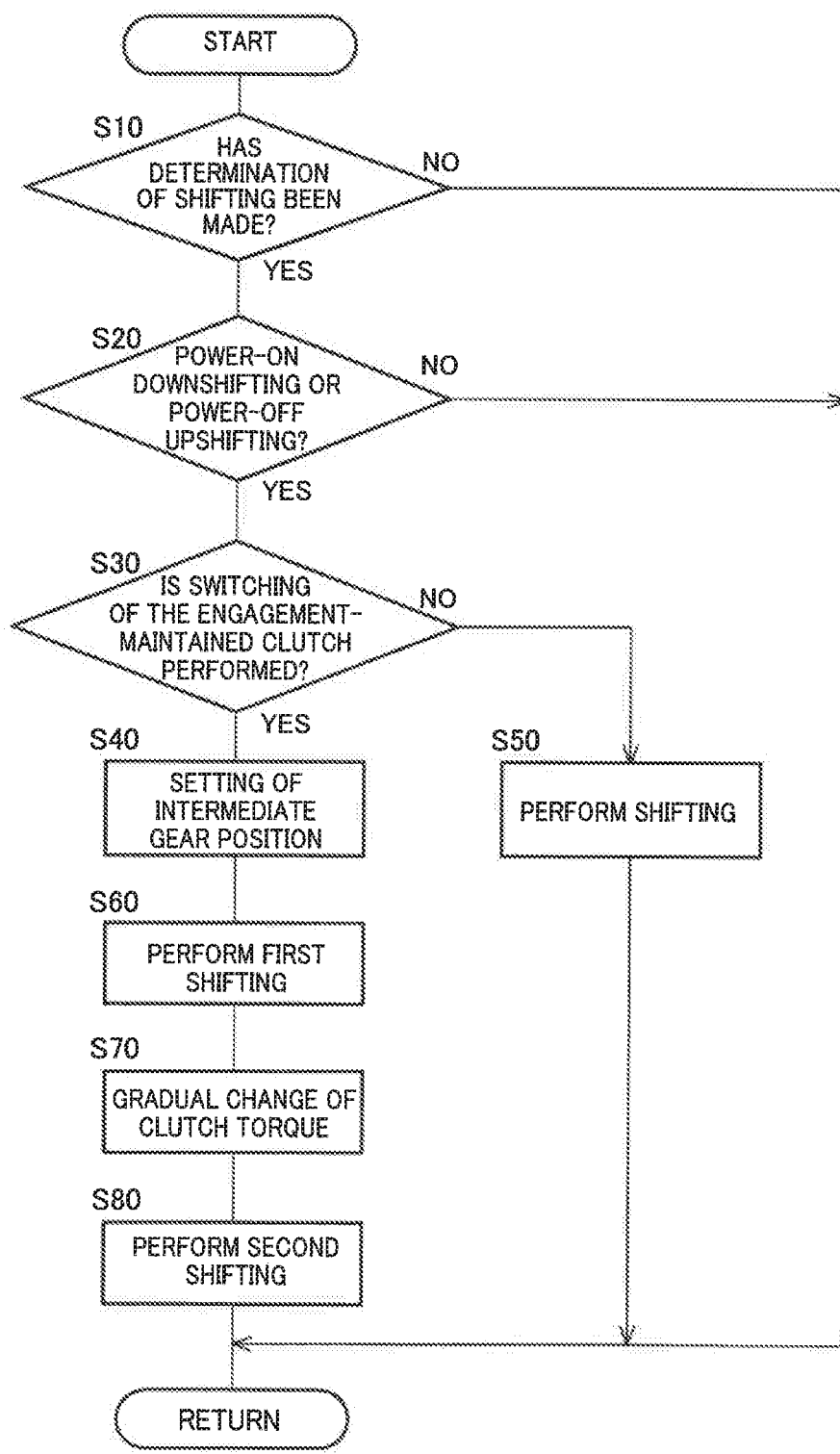
FIG. 4 is a flowchart for describing principal portions of a control operation of the electronic control device.

FIG. 4 is a flowchart for describing principal portions of a control operation of the electronic control device 70, that is, the control operation for appropriately executing the desired shifting of the automatic transmission 18 using the shifting model even when multiple shifting occurs and alleviating shock occurring in accompaniment with change of the engaged-side required engagement torque of the first shifting S1 that may occur between the first shifting S1 and the second shifting S2 and is executed repeatedly at an extremely short cycle time, for example, of several msec to several dozen msec.

In FIG. 4, in step (hereinafter, step is omitted) S10 corresponding to the shifting controlling portion 74, it is determined whether or not execution of shifting has been determined is. If a negative determination is made in S10, S10 is repeatedly implemented. Also, if a positive determination is made in S10, whether or not the shifting that is executed is a power-on downshifting or a power-off upshifting is determined in S20 corresponding to the shifting controlling portion 74. If a negative determination is made in S20, S10 is repeatedly implemented. Also, if a positive determination is made in S20, whether or not the shifting is a shifting in which switching of the engagement-maintained clutch Cm occurs, that is, a multiple shifting is determined in S30 corresponding to the shifting controlling portion 74. If a negative determination is made in S30, that is, if it is determined that switching of the engagement-maintained clutch Cm is unnecessary, shifting based on a single set of motion equations is performed, without the intermediate gear position M1 being set, in S50 corresponding to the functions of the required engagement torque calculating portion the engine output controlling portion 72 and the shifting controlling portion 74. Also, if a positive determination is made in S30, the intermediate gear position M1 is set in S40 corresponding to the function of the intermediate gear position setting portion 84 of the multiple shifting controlling portion 82. The first shifting S1 is executed in S60 corresponding to the functions of the required engagement torque calculating portion 76, the engine output controlling portion 72 and the shifting controlling portion 74.

Also, after the first shifting S1 is performed, the calculation of the gradual change rate Tg of the clutch torque and the control of the clutch torque are performed in S70 corresponding to the functions of the clutch torque gradual change calculating portion 86 and the shifting controlling portion 74, such that the gradual change is made from the required value Tcf1 (required at the first shifting completion time) of the engaged-side required engagement torque Tcap11 in the first shifting S1 toward the required value of the engagement-maintained clutch Cm that is determined by the motion equations of the second shifting S2, that is, the second shifting engagement-maintained clutch required engagement torque Tct2 that is required for making the engaged-side clutch in the first shifting S1 become completely engaged. After the predetermined time elapses from the start of the gradual change, the second shifting S2 is executed in S80 corresponding to the functions of the required engagement torque calculating portion 76, the engine output controlling portion 72 and the shifting controlling portion 74.

Figure 5:
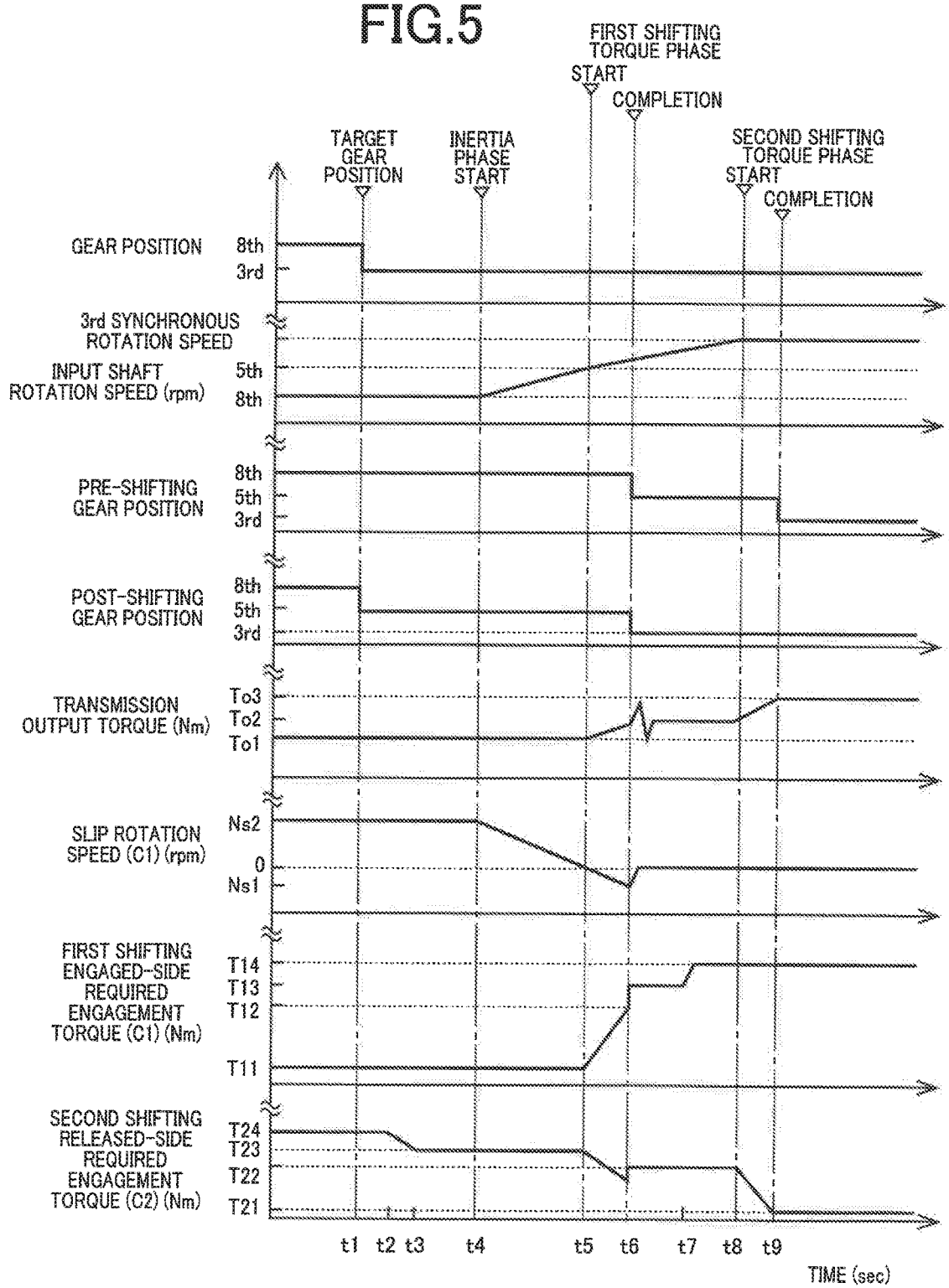
FIG. 5 is an example or a time chart in a case where a gradual change of clutch torque is not executed in the control operation shown in the flowchart of FIG. 4.

An example where the second shifting S2 is performed after completion of the first shifting S1 is shown in FIG. 5. FIG. 5 illustrate operation in a case without the clutch torque gradual change control corresponding to the clutch torque gradual change calculating portion 86 of FIG. 3 and S70 of FIG. 4. At a point t1, the target gear position is changed from the eighth gear position 8th to the third gear position 3rd, and because the downshifting from the eighth gear position 8th to the third gear position 3rd is a multiple shifting that accompanies the change of the engagement-maintained clutch Cm, the fifth gear-position 5th, which is a post-shifting gear position, is set as the intermediate gear position M1. In the shifting from the eighth gear position 8th to the third gear position 3rd of FIG. 5, the clutch C2 is the engagement-maintained clutch Cm in the first shifting S1 and the clutch C1 is the engagement-maintained clutch Cm in the second shifting S2. The required engagement torque Tct1 of the second shifting released-side clutch, that is, the first shifting engagement-maintained clutch C2 is decreased from T24 at a point t2 and is decreased to T23 at a point t3. This is done, as described above, to avoid the second shifting released-side required engagement torque from remaining excessively in the switching from the first shifting S1 to the second shifting S2 and causing delay of the change of the transmission input rotation speed ωi in its changing process that accompanies the shifting. At a point t4, the inertia phase in the first shifting S1 is started and the increasing of the input shaft rotation speed ωi is started and the decrease of the slip rotation speed ωs of the first shifting engaged-side clutch C1 from Ns2 is also started.

At a point t5, the input shaft rotation speed ωi reaches the synchronous rotation speed of the fifth gear position 5th and the torque phase of the first shifting S1 is started. Also, the slip rotation speed ωs of the first shifting engaged-side clutch C1 indicates a value of substantially zero. From the point t5, the torque allocations (x1, xapl1, and xdrn1) in the first shifting S1 are changed and the first shifting engaged-side required engagement torque Tcap11 increases. At a point t6, the torque phase is completed and switching to the second shifting S2 is performed based on the output torque To reaching the output torque To2 in the inertia phase in the second shifting S2. The completion of the torque phase may be determined, for example, by the elapse of a predetermined time from the reaching of the fifth gear position 5th. Also, the slip rotation speed ωs of the first shifting engaged-side clutch C1 is Ns1.

At the point t6, the second shifting S2 is started. That is, the pre-shifting gear position and the post-shifting gear position are switched, from the eighth gear position 8th and the fifth gear position 5th in the first shifting S1, to the fifth gear position 5th and the third gear position 3rd in the second shifting S2. By the switching to the second shifting S2, the torque of the clutch C1, that is, the first shifting engaged-side required engagement torque Tcapl1 is increased from the required value Tcfl required at the first shifting completion time (which gives rise to slipping of the clutch C1), that is, the required engagement torque T12 of the clutch C1 required at the completion time of the first shifting S1 (which is determined with use of the gear train motion equations in the first shifting S1), to the second shifting engagement-maintained clutch required engagement torque Tct2 of the second shifting S2 at which the clutch C1 exhibits complete engagement, that is, the required engagement torque T13 of the clutch C1 that is determined with use of the gear train motion equations in the second shifting S2, and the slip rotation speed ωs of the clutch C1 is changed rapidly from Ns1 to substantially zero. Shock due to change of the transmission output torque To thereby occurs. At a point t7, the second shifting engagement-maintained clutch required engagement torque Tct2 of the second shifting S2 is increased further toward T14, with which the predetermined safety factor for maintaining the engagement is taken into consideration. When the torque phase in the second shifting S2 is started at a point t8, the torque allocations (x2, xapl2, xrdn2) in the second shifting S2 are changed. The torque phase in the second shifting S2 may be determined by the reaching of the input shaft rotation speed ωi at the synchronous rotation speed of the third gear position 3rd. At a point t9, the output torque To also reaches To3, the torque phase of the second shifting S2 is completed, and the shifting to the third gear position 3rd is completed.

Figure 3:
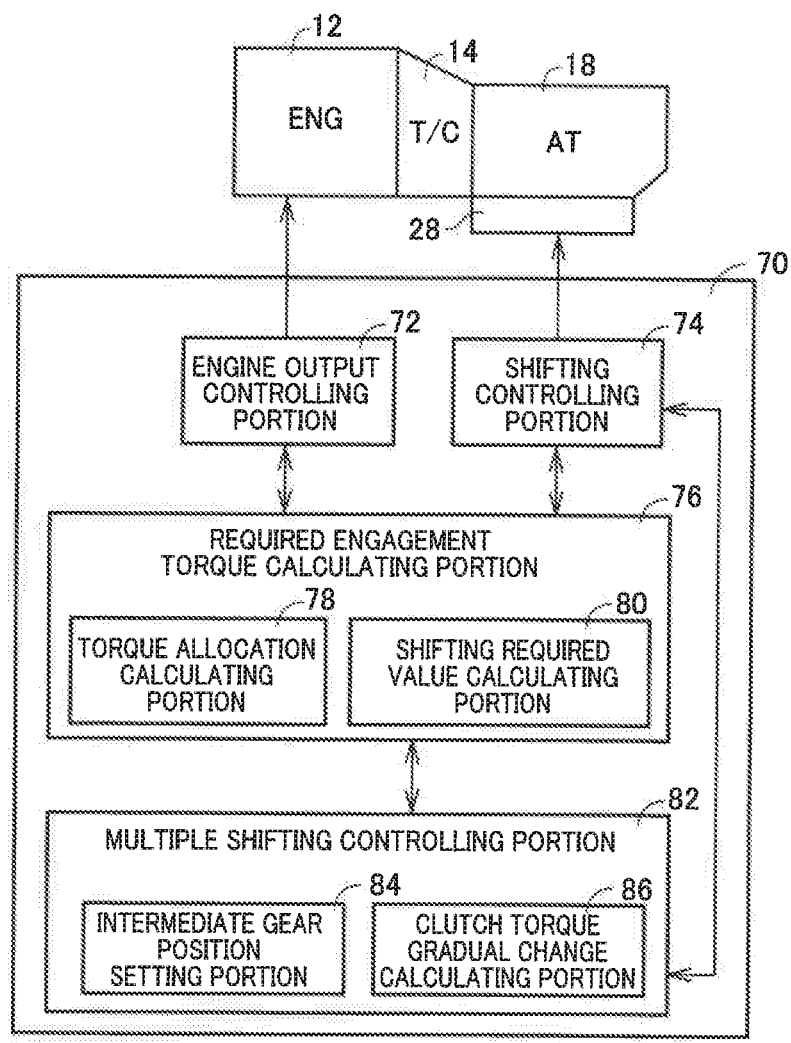
FIG. 3 is a functional block diagram describing principal control functions of an electronic control device of the vehicle in FIG. 1.
Figure 6:
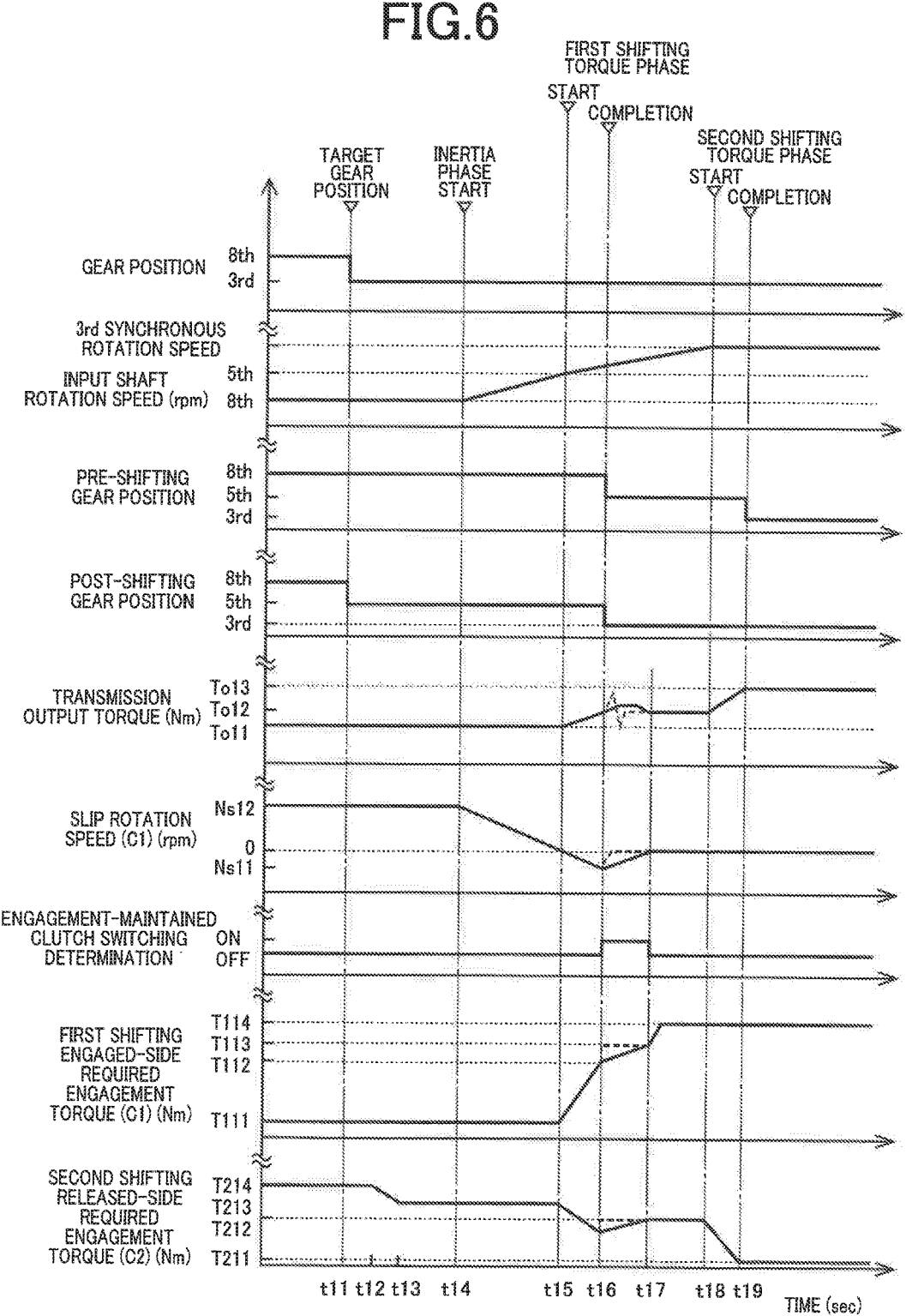
FIG. 6 is an example of a time chart in a case where the control operation shown in the flowchart of FIG. 4 is executed where an intermediate gear position is set and a gradual change of the clutch torque is executed in execution of multiple shifting in power-on downshifting.

FIG. 6 describes an operation of suppressing the rapid change of the slip rotation speed ωs of the clutch C1 that occurs at the point t6 in FIG. 5, owing to the clutch torque gradual change control corresponding to the clutch torque gradual change calculating portion 86 of FIG. 3 and S70 of FIG. 4 and, besides this point, is the same as FIG. 5 and description shall be started from a point t15. At the point t15, the input shaft rotation speed ωi reaches the synchronous rotation speed of the fifth gear position 5th and the torque phase of the first shifting S1 is started. Also, the slip rotation speed ωs of the first shifting engaged-side clutch C1 indicates a value of substantially zero. When, at a point t16, the torque phase is completed, and the output torque To reaches an output torque To12 in the inertia phase of the second shifting S2, determination of the condition for switching the engagement-maintained clutch Cm is performed, a difference between the required value Tcfl (required at the first shifting completion time) of the en-gaged-side required engagement torque Tcapl1 in the first shifting S1 and the second shifting engagement-maintained clutch required engagement torque Tct2 that is set in the second shifting S2 for the same clutch C1, that is, the first shifting engaged-side clutch C1 that is to be the engagement-maintained clutch Cm, which is maintained in the engaged state during the shifting of the second shifting S2, is calculated, a rate of change of the first shifting engaged-side required engagement torque is calculated by dividing the above-described difference by the predetermined time interval ta, that is, the elapsed time from t16 to t17, and hydraulic control of the clutch C1 is performed based on the calculated rate of change. Also, during the gradual change, successive calculation is performed by means of the motion equations of the second shifting S2. Based thereon, the change to the second shifting engagement-maintained clutch required engagement torque Tct2 is performed.

At a point t17, the second shifting engagement-maintained clutch required engagement torque Tct2 of the second shifting S2 reaches an engagement torque T113 at which complete engagement is achieved and the slip rotation speed becomes substantially zero. That is, the gradual change is performed from a required engagement torque T112 of the clutch C1 which is required at the completion time of the first shifting S1 and which is determined with use of the gear train motion equations in the first shifting S1, to the second shifting engagement-maintained clutch required engagement torque Tct2 of the second shifting S2, at which the clutch C1 exhibits complete engagement, that is, the required engagement torque T113 of the clutch C1 that is determined with use of the gear train motion equations in the second shifting S2. Also, from the point t16 onward, the second shifting engagement-maintained clutch required engagement torque Tct2 of the first shifting engaged-side clutch C1, that is, the second shifting S2 is increased further toward T114, with which the predetermined safety factor for maintaining the engagement is taken into consideration. Also, at the point t17, the switching determination of the engagement-maintained clutch Cm is completed. At a point t18, the torque phase of the second shifting S2 is started, change of the torque allocations in the second shifting S2 is performed, and, at a point t19, the second shifting S2 is completed.

According to the present embodiment, the control device of the automatic transmission 18 is provided for the vehicle 11 that includes (i-1) the engine 12 as the drive source and (ii-2) the drive wheels 26. The automatic transmission 18 includes (ii-1) the input shaft 16 receiving power from the engine 12 as the drive source, (ii-2) the output shaft 20 transmitting the power to the drive wheels 26, and (ii-3) the clutches C and brakes B as the plurality of engagement devices that are selectively engaged and released to establish a plurality of gear positions in the automatic transmission 18. The control device is configured to execute shifting by successively controlling the engagement devices with required engagement torques calculated by introducing the constraint condition in the gear train motion equations set in advance for determining the control operation amounts that achieves the To and dwt/dt as the shifting target values. The control device is configured, in a case where the shifting is executed by releasing two of the engagement devices and engaging two of the engagement devices, to execute the first shifting S1 between the pre-shifting gear position and the intermediate gear position M1, and the second shifting S2 between the intermediate gear position M1 and the post-shifting gear position, such that each of the first shifting S1 and the second shifting S2 is executed by releasing one of the engagement devices and engaging one of the engagement devices. Further, the control device is configured, upon transition from the first shifting S1 to the second transition S2, to gradually changing the engagement torque of the engagement-maintained engagement device (engagement-maintained clutch Cm) as one of the engagement devices which is engaged to establish the intermediate gear position M1, and which is engaged upon completion of the first shifting S1 and is maintained in the engaged state during the second shifting S2, such that the engagement torque of the engagement-maintained engagement device (engagement-maintained clutch Cm) is changed gradually from the engaged-side required engagement torque Tcapl1 required upon completion of the first shifting S1, to the engagement-maintained required engagement torque Tct2 which is required in the second shifting S2 and which is calculated by the gear train motion equations. That is, the gradual change is performed from the required engagement torque T112 of the clutch C1 which is required at the completion time of the first shifting S1 and which is determined using the gear train motion equations in the first shifting S1, to the second shifting engagement-maintained clutch required engagement torque Tct2 of the second shifting S2, at which the clutch C1 exhibits complete engagement, that is, the required engagement torque T113 of the clutch C1 that is determined with use of the gear train motion equations in the second shifting S2. Thereby, using a concise method that would not make the constraint conditions to become complex, smooth change of the rotation speed is enabled without causing stagnation of the input shaft rotation speed ωi at the intermediate gear position M1 and the occurrence of shock due to change of the inertial torque that arises due to the torque difference of the required engagement torques at the intermediate gear position M1, is suppressed.

Other embodiments of the present invention shall now be described. In the following description, portions in common to the embodiment described above shall be provided with the same symbols and description thereof shall be omitted.

Embodiment 2

Figure 7:
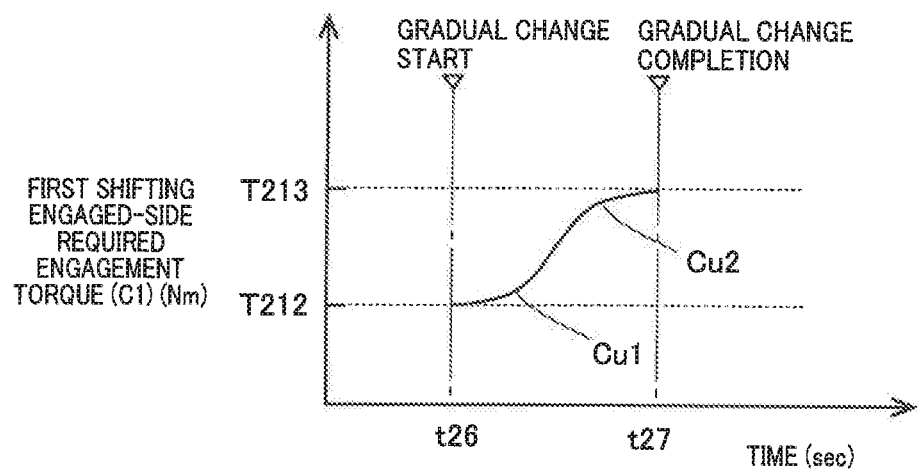
FIG. 7 is an example of a case where the gradual change in the time chart of FIG. 6 is performed such that the torque is changed along a curve, with which a rate of change of the torque per unit time is made smaller at an initial stage and a final stage of the gradual change.

In FIG. 6, it is deemed that the calculation of the required engagement torques is made such that the difference between the required value Tcf1 at the first shifting completion time of the engaged-side required engagement torque Tcap11 in the first shifting S1 and the second shifting engagement-maintained clutch required engagement torque Tct2 (which is set for the engaged-side clutch in the first shifting S1 that is to be the engagement-maintained clutch Cm in the second shifting S2), is calculated, and the rate of change of the first shifting engaged-side required engagement torque Tcap11 is calculated by dividing the calculated difference by the predetermined time interval, that is, the elapsed time from t16 to t17. As shown in FIG. 7, in the present embodiment, the change, from a required value T212 at the first shifting completion time to a target torque T213, set for the engaged-side clutch in the first shifting S1 that is to be the engagement-maintained clutch Cm in the second shifting S2, which takes place from the start of the gradual change to the completion of the gradual change may be performed, for example, based on curves Cu1 and Cu2, so that the rate of change of torque is made relatively small at the start and the completion of the gradual change, (namely, the rate of change of the torque is made smaller at an initial stage and a final stage of the gradual change period, than at an intermediate stage) so as to further decrease the shock due to the change of the first shifting engaged-side required engagement torque Tcap11 in the elapsed time from t26 to t27. That is, the change from the value T212 to the value T213 may be made such that the rate of change of the required engagement torque in a vicinity of the point t26 and in a vicinity of the point t27 to be gradual in comparison to that of a region close to a center between the point t26 and the point t27 that is another time region. FIG. 7 shows the rate of change of torque in the gradual change, and indication of the torques before the gradual change and after the gradual change is omitted in FIG. 7. A straight line may be interposed between the two curves Cu1 and Cu2. The curves Cu1 and Cu2 and the straight line (between the curves Cu1, Cu2) may be curves or straight lines approximated by the required engagement torque and are constituted of step-like straight lines that change in the form of steps at each control cycle. It is noted that the point t26 shown in FIG. 7 corresponds to the point t16 shown in FIG. 6, and that the point t27 shown in FIG. 7 corresponds to the point t17 shown in FIG. 6. It is further noted that the value T212 shown in FIG. 7 corresponds to the value T112 shown in FIG. 6, and that the value T213 shown in FIG. 7 corresponds to the value T113 shown in FIG. 6.

In the gradual change from the required value Tcf1 at the first shifting completion time of the engaged-side required engagement torque Tcap11 in the first shifting S1, to the engagement-maintained clutch required engagement torque Tct2 in the second shifting S2, by performing the change based on curves, with which the rate of change of torque is made small at the start and the completion of the gradual change, the change of the inertial torque can be suppressed even more effectively.

Embodiment 3

Figure 8:
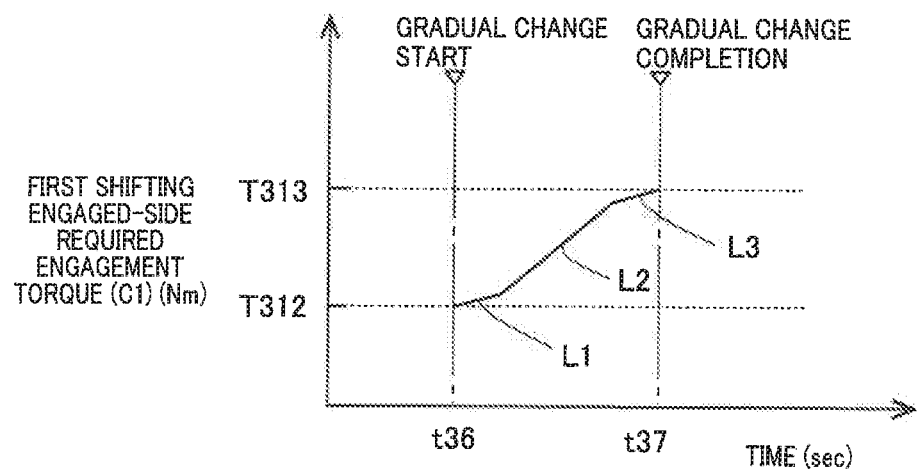
FIG. 8 is an example of a case where the gradual change in the time chart of FIG. 6 is performed such that the rate of change of the torque per unit time is gradually changed based on at least three straight lines at an initial stage, an intermediate stage and a final stage of the gradual change.

Whereas in FIG. 6, it is deemed that the calculation of the required engagement torques is made such that the difference between the required value Tcf1 at the first shifting completion time of the engaged-side required engagement torque Tcap11 in the first shifting S1 and the engagement-maintained clutch required engagement torque Tct2 in the second shifting S2 that is set for the engaged-side clutch C1 in the first shifting S1 that is to be the engagement-maintained clutch Cm in the second shifting S2, is calculated, and the change of the first shifting engaged-side required engagement torque Tcap11 is calculated by dividing the calculated difference by the predetermined time interval, that is, the elapsed time from t16 to t17, the present invention is not particularly restricted thereto. As shown in FIG. 8, the change, from a required value T312 at the first shifting completion time to a target torque T313, set for the engaged-side clutch in the first shifting S1 that is to be the engagement-maintained clutch Cm in the second shifting S2, which takes place from the start of the gradual change to the completion of the gradual change may be performed, for example, based on three straight lines L1, L2, and L3, with which the rate of change of torque is made relatively small at the start and the completion of the gradual change in the gradual change from the engaged-side required engagement torque Tcap11 in the first shifting S1 to the engagement-maintained clutch required engagement torque Tct2 in the second shifting S2, (namely, the rate of change of the torque is made smaller at an initial stage and a final stage of the gradual change period, than at an intermediate stage) so as to further decrease the shock due to the change of the first shifting engaged-side required engagement torque in the elapsed time from t36 to t37. FIG. 8 shows the time rate of change of torque in the gradual change, and indication of the torques before the gradual change and after the gradual change is omitted in FIG. 8. It is noted that the point t36 shown in FIG. 8 corresponds to the point t16 shown in FIG. 6, and that the point t37 shown in FIG. 8 corresponds to the point t17 shown in FIG. 6. It is further noted that the value T312 shown in FIG. 8 corresponds to the value T112 shown in FIG. 6, and that the value T313 shown in FIG. 8 corresponds to the value T113 shown in FIG. 6.

In the gradual change from the required value Tcf1 at the first shifting completion time of the engaged-side required engagement torque Tcap11 in the first shifting S1 to the engagement-maintained clutch required engagement torque Tct2 in the second shifting S2, by performing the change based on at least three straight lines, with which the rate of change of torque is made small at the start and the completion of the gradual change, the change of the inertial torque can be suppressed even more effectively by an easy method.

Embodiment 4

When, in the transition from the first shifting S1 to the second shifting S2 in FIG. 6, the difference between the engaged-side required engagement torque Tcapl1 in the first shifting S1 and the required engagement torque Tct2 for the engagement-maintained clutch Cm in the second shifting S2 in the same engagement clutch C or B is not larger than a threshold value, a feature of switching to the required engagement torque Tct2 for the engagement-maintained clutch Cm in the second shifting S2, without performing the gradual change from the engaged-side required engagement torque Tcapl1 in the first shifting S1 to the required engagement torque Tct2 for the engagement-maintained clutch Cm in the second shifting S2, may be provided as shown in the flowchart of FIG. 9. The flowchart of FIG. 9 is the same as the flowchart of FIG. 4 from S10 to S60, and with the exception of S60, the indication of the steps from S10 to S50 is omitted in FIG. 9.

By switching to the engagement-maintained required torque Tct2 in the second shifting S2, without performing the gradual change from the target torque in the first shifting S1 to the engagement-maintained required torque Tct2 for the engagement-maintained clutch Cm in the second shifting S2, when, in the transition from the first shifting S1 to the second shifting S2, the torque difference, for the same engagement clutch C or B, between the engaged-side required engagement torque Tcapl1 in the first shifting S1 and the engagement-maintained clutch required engagement torque Tct2 in the second shifting S2 is not larger than a threshold value, the control can be prevented from becoming complex when the shock that is generated is not larger than a predetermined level.

Although in the embodiments described above, the output shaft 20 is given as an example of the rotating member at the output shaft 20 side, the present invention is not restricted thereto and the rotating member at the output shaft 20 side may be a rotating member provided in the power transmission path from the output shaft 20 to the drive wheels 26. Although the input shaft 16 is given as an example of the rotating member at the input shaft 16 side, the present invention is not restricted thereto and the rotating member at the input shaft 16 side may be a rotating member provided in the power transmission path from the engine 12 to the input shaft 16.

The above-described embodiments are only illustrative and the present invention may be implemented in modes with various modifications and improvements added based on the knowledge of a person skilled in the art.

REFERENCE SIGNS LIST

12: Engine (Driving force source)
16: Input shaft
18: Automatic transmission (Automatic transmission for vehicle)
20: Output shaft
70: Electronic control device (Control device)
76: Required engagement torque calculating means
C1 to C4: Clutch (Engagement device)
C1: Engagement-maintained clutch in a second shifting when downshifting from an eighth gear position 8th to a third gear position 3rd
C2: Engagement-maintained clutch in a first shifting when the downshifting from the eighth gear position 8th to the third gear position 3rd
B1, B2 Brake (Engagement device)
S1: First shifting
S2: Second shifting
M1: Intermediate gear position
Cm: Engagement-maintained clutch (Engagement-maintained engagement device)
To: Transmission output torque (Shifting target value)
dωt/dt: input shaft angular acceleration (Shifting target value)
Tcapl1: Engaged-side required engagement torque
Tct2: Second shifting engagement-maintained clutch required engagement torque
ta: a time set in advance

What is claimed is:

1. A control device of an automatic transmission for a vehicle that includes (i-1) a drive source and (i-2) drive wheels, the automatic transmission including (ii-1) an input shaft receiving power from the drive source, (ii-2) an output shaft transmitting the power to the drive wheels, and (ii-3) a plurality of engagement devices that are selectively engaged and released to establish a plurality of gear positions in the automatic transmission, the control device being configured to execute shifting by successively controlling the engagement devices with required engagement torques calculated by introducing a constraint condition in gear train motion equations set in advance for determining control operation amounts that achieves shifting target values, the control device being configured, in a case where the shifting is executed by releasing two of the engagement devices and engaging two of the engagement devices, to execute a first shifting between a pre-shifting gear position and an intermediate gear position, and a second shifting between the intermediate gear position and a post-shifting gear position, such that each of the first shifting and the second shifting is executed by releasing one of the engagement devices and engaging one of the engagement devices, and the control device being configured, upon transition from the first shifting to the second transition, to gradually changing an engagement torque of an engagement-maintained engagement device as one of the engagement devices which is engaged to establish the intermediate gear position, and which is engaged upon completion of the first shifting and is maintained in the engaged state during the second shifting, such that the engagement torque of the engagement-maintained engagement device is changed gradually from a required engagement torque required upon completion of the first shifting, to a required engagement torque which is required in the second shifting and which is calculated by the gear train motion equations.

2. The control device according to claim 1, wherein the torque of the engagement-maintained engagement device is changed gradually from the required engagement torque required upon completion of the first shifting to the required engagement torque required in the second shifting in a gradual change period, such that a rate of change of the torque of the engagement-maintained engagement device at an initial stage of the gradual change period is gradually increased away from zero toward a given value that is larger than zero, such that a rate of change of the torque of the engagement-maintained engagement device at an intermediate stage of the gradual change period is the given value, and such that a rate of change of the torque of the engagement-maintained engagement device at a final stage of the gradual change period is gradually reduced away from the given value toward zero.

3. The control device according to claim 1,
wherein the torque of the engagement-maintained engagement device is gradually changed from the required engagement torque required upon completion of the first shifting to the required engagement torque required in the second shifting in a gradual change period, such that a rate of change of the torque of the engagement-maintained engagement device at an initial stage of the gradual change period is a first constant value, such that a rate of change of the torque of the engagement-maintained engagement device at an intermediate stage of the gradual change period is a second value larger than the first constant value, and such that a rate of change of the torque of the engagement-maintained engagement device at a final stage of the gradual change period is a third constant value smaller than the second value.

4. The control device according to claim 1,
wherein the torque of the engagement-maintained engagement device is gradually changed from the required engagement torque required upon completion of the first shifting to the required engagement torque required in the second shifting in a gradual change period that is a given length of time.

5. The control device according to claim 1,
wherein the torque of the engagement-maintained engagement device is gradually changed from the required engagement torque required upon completion of the first shifting to the required engagement torque required in the second shifting, when a difference between the required engagement torque required upon completion of the first shifting and the required engagement torque required in the second shifting is larger than a threshold value, and
wherein the torque of the engagement-maintained engagement device is changed from the required engagement torque required upon completion of the first shifting to the required engagement torque required in the second shifting, in a non-gradual manner, when the difference between the required engagement torque required upon completion of the first shifting and the required engagement torque required in the second shifting is not larger than the threshold value.

6. The control device according to claim 1,
wherein the torque of the engagement-maintained engagement device is gradually changed from the required engagement torque required upon completion of the first shifting to the required engagement torque required in the second shifting, when shifting from the pre-shifting gear position to the post-shifting gear position corresponds to power-on downshifting or power-off upshifting.

\* \* \* \* \*